July 26, 1927.  M. L. HOWELL  1,637,151
BRAKE CHAIN OPERATING MEANS
Filed Jan. 16, 1926
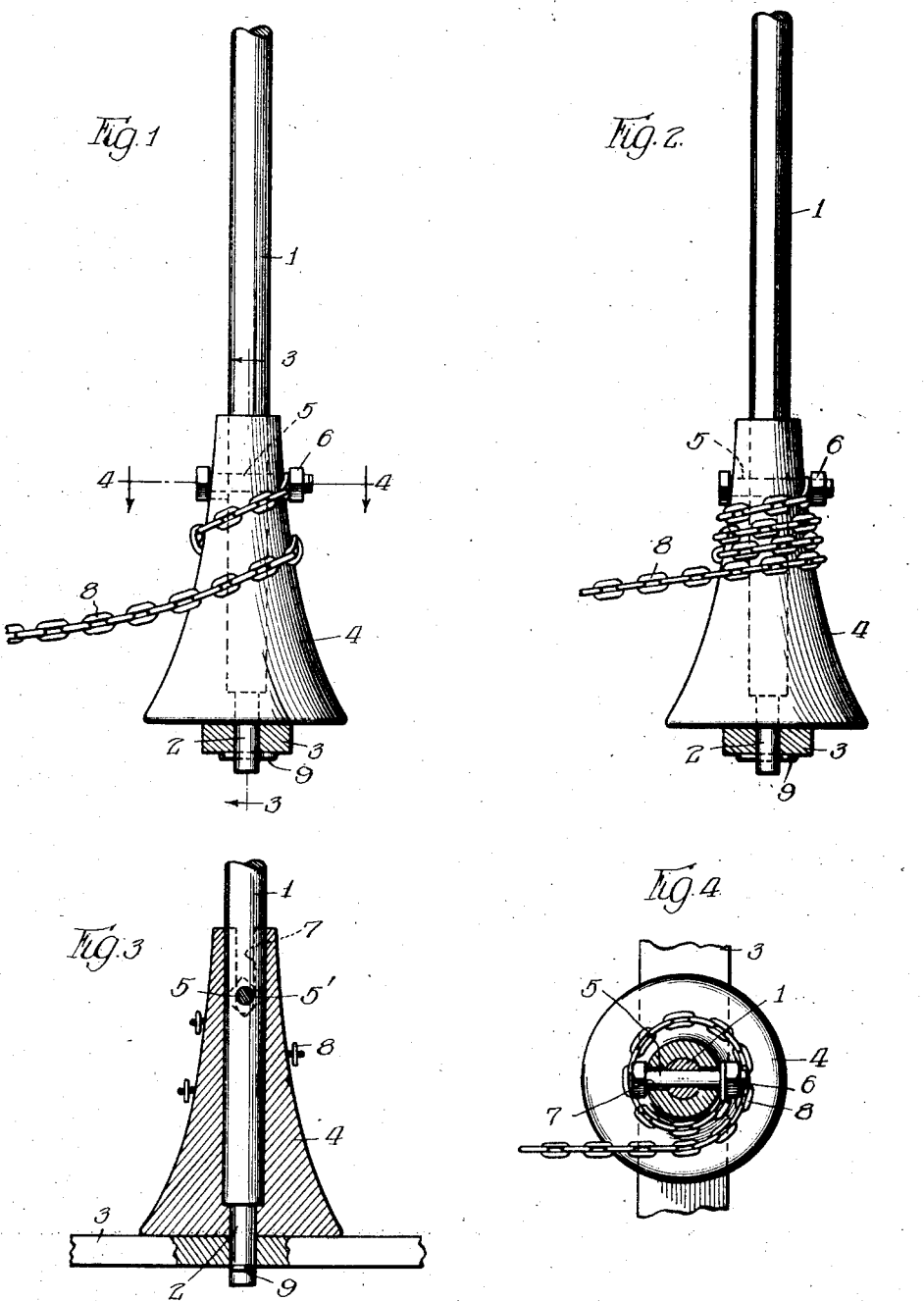

Patented July 26, 1927.

1,637,151

UNITED STATES PATENT OFFICE.

MARTIN L. HOWELL, OF FREEDOM, PENNSYLVANIA.

BRAKE-CHAIN-OPERATING MEANS.

Application filed January 16, 1926. Serial No. 81,669.

The present invention relates to brake chain operating means.

More particularly the present invention relates to means for winding a chain or other flexible member. The present invention will be described particularly with reference to railroad practice, though it will be understood as the description proceeds that the invention is of broader application.

Under present practice, the means for attaching the brake chains to the brake rods of railway cars results in the "bunching" of the chain on the brake staff, preventing full application of the brakes and causing damage to the cars and contents. One of the largest items in loss and damage payments, which payments run into millions of dollars yearly, is attributed to rough handling, the greater percentage of which is done in switching service.

An object of the present invention is to provide chain winding means which will enable a switchman to have full control of his car at all times.

A further object is to provide chain winding means which is simple in construction, which is readily applicable to brake staffs as now commonly used, and which will effectually prevent the bunching of the brake chain as above referred to.

A further object is to provide simple winding mechanism which will automatically distribute a chain being wound thereon to prevent bunching.

Further objects will appear as the description proceeds.

Referring to the drawings—

Figure 1 is a view in side elevation of a brake staff having an embodiment of the present invention applied thereto, the chain associated therewith being in slack position;

Figure 2 is a view similar to Figure 1 but showing the chain in taut condition;

Figure 3 is a longitudinal sectional view taken along the plane indicated by the arrows 3—3 of Figure 1; and Figure 4 is a transverse sectional view taken along the plane indicated by the arrows 4—4 of Figure 1.

The numeral 1 indicates a brake staff which may be the regular brake staff commonly encountered in service. The brake staff 1 is commonly provided with a reduced end portion 2, which is mounted within a bar or plate 3. It is common practice to secure the end of the brake chain to the brake staff 1 and to wind said brake chain upon said staff 1.

According to the present invention, a winding member 4 is provided, which is of the form of a frustum of a cone, the smaller portion of which is uppermost. It will be clear from an inspection of the drawings that the illustrated member 4 has a conformation varying somewhat from the mathematical definition of a frustum of a cone, said conformation being that developed by the rotation of a curved line rotated about the axis of the brake staff 1. The particular curvature of a vertical line defining the exterior surface of the member 4 may be chosen as desired to suit conditions, a true frusto-conical conformation being contemplated if such a conformation is preferred.

The winding member 4 is non-rotatably connected to the brake staff 1 by means of any preferred holding means, as for example a cotter pin, or, as illustrated in the drawing, a bolt 5 and nut 6. Said bolt 5 is disposed within a diametrical hole 5' in the staff 1, which hole has heretofore been provided for the holding means for securing the winding chain to said brake staff.

The member 4 is slotted at its upper extremity as indicated by the numeral 7, thereby rendering the present invention applicable to brake staffs in which the holes 5' are disposed at different distances from the lower extremities thereof.

The winding chain is indicated by the numeral 8, one end of said chain 8 being secured to the bolt 5 and the other end of said chain being secured to the brake mechanism of the car (not shown). It will be clear, of course, that instead of the bolt 5 and nut 6, a cotter pin may be used. A cotter pin 9 is illustrated at the bottom of the device for preventing vertical movement of the brake staff 1. Though the member 8 has been referred to herein as a chain, it will be clear that any equivalent flexible member, such as a cable, may be used. The term "chain" is used for the reason that it is a term commonly used in the art, but it is to be construed to include a flexible cable.

The cost of installation of the present invention is almost negligible. In installing the present invention, the operative will remove the usual cotter pin 9 and also remove the cotter pin or other holding means for securing the brake chain to the usual form of brake staff. The operative will raise the staff, insert the member 4 on the lower extremity thereof, mount the staff with the end portion 2 thereof in the member 3, and replace the cotter pins or other holding means. By reason of the slot 7, the invention is applicable to brake staffs in which the holding member 5 is located at different distances from the lower extremity of the brake staff.

In practice it will be clear that the brake chain 8, provided said brake chain is extended laterally from a vertically disposed brake staff, will under slack conditions tend to dispose itself upon the lower portions of the winding means. Such conditions are illustrated in Figure 1. When the brake staff is turned, however, and the brake chain 8 is put under tension, the pull in said brake chain will cause same to slide upwardly upon the conical surface of the member 4, whereby said chain will assume the regular folds illustrated in Figure 2. There is therefore no tendency for the brake chain upon being put under tension to wrap itself in bunches about the brake winding means.

The present invention has proven itself very effective in preventing the bunching of the brake chain, and, in view of its simplicity and low cost of installation, constitutes a valuable portion of the winding mechanism of a car.

Though a preferred embodiment of the present invention has been described in detail, many modifications will occur to those skilled in the art. It is intended to cover all such modifications that fall within the scope of the appended claims.

What is claimed is—

1. In combination, a brake staff having a hole therethrough for the insertion of chain securing means, a frusto-conical member mounted upon said brake staff having its smaller extremity uppermost, chain securing means disposed in said hole and in said frusto-conical member to cause said brake staff and frusto-conical member to turn as a unit, and a chain secured to said chain securing means.

2. In combination, a brake staff having a hole therethrough for the insertion of chain securing means, a frusto-conical member mounted upon said brake staff having its smaller extremity uppermost, chain securing means disposed in said hole and in said frusto-conical member to cause said brake staff and frusto-conical member to turn as a unit, and a chain secured to said chain securing means, said chain securing means being disposed adjacent to the smaller extremity of said frusto-conical member.

3. In combination, a brake staff having a hole therethrough for the insertion of chain securing means, a frusto-conical member mounted upon said brake staff having its smaller extremity uppermost, chain securing means disposed in said hole and in said frusto-conical member to cause said brake staff and frusto-conical member to turn as a unit, and a chain secured to said chain securing means, said frusto-conical member having a longitudinal slot at its smaller extremity for receiving said chain securing means.

4. Chain winding means comprising a vertically disposed frusto-conical member, the smaller extremity of which is uppermost, and chain securing means secured to said frusto-conical member adjacent to the upper extremity thereof.

5. Chain winding means comprising a winding staff, a frusto-conical member mounted thereon, said frusto-conical member having its smaller extremity uppermost, an aperture through said winding staff, a slot in the smaller end of said frusto-conical member adapted to be brought into coincidence with said aperture, a winding chain, and means having the double function of preventing relative rotation between said staff and said frusto-conical member and for securing one end of said winding chain.

Signed at Freedom, Pennsylvania, this day of Jan. 13, 1926.

MARTIN L. HOWELL.